United States Patent [19]
Hansen et al.

[11] Patent Number: 5,891,957
[45] Date of Patent: Apr. 6, 1999

[54] ADHESIVE COMPOSITION FOR SKIN ADHESION AND BANDAGE APPLICATIONS

[75] Inventors: David Romme Hansen, Houston, Tex.; Ralf Korpman, Yalaha, Fla.

[73] Assignee: Shell Oil Company, Houston, Tex.

[21] Appl. No.: 941,497

[22] Filed: Sep. 30, 1997

Related U.S. Application Data

[60] Provisional application No. 60/029,303 Oct. 24, 1996.

[51] Int. Cl.$^6$ ..................................................... C08L 53/02
[52] U.S. Cl. ................................. 525/89; 525/98; 525/99
[58] Field of Search .................................. 525/89, 98, 99

[56] References Cited

U.S. PATENT DOCUMENTS

| | | | |
|---|---|---|---|
| 4,080,348 | 3/1978 | Korpman | 260/27 BB |
| 4,136,071 | 1/1979 | Korpman | 260/27 BB |
| 5,039,750 | 8/1991 | Miller et al. | 525/237 |
| 5,274,036 | 12/1993 | Korpman et al. | 525/92 |
| 5,462,538 | 10/1995 | Korpman | 604/358 |

FOREIGN PATENT DOCUMENTS

| | | |
|---|---|---|
| 0333936 | 3/1988 | European Pat. Off. . |
| 0683187 A1 | 3/1995 | European Pat. Off. . |

OTHER PUBLICATIONS

European Search Report of 3 Feb. 1998.

*Primary Examiner*—Jeffrey C. Mullis
*Attorney, Agent, or Firm*—Donald F. Haas

[57] ABSTRACT

A pressure sensitive adhesive composition for skin adhesion and bandage applications which comprises (a) 100 parts by weight of a styrene-isoprene-styrene triblock or multiarm copolymer which has a coupling efficiency of 20 to 50%, an overall absolute arm molecular weight of 33,000 to 100,000, a polystyrene content of 18 to 30%, and a polystyrene block weight average molecular weight of 11,000 to 20,000, and (b) from 100 to 400 parts by weight of a styrene-isoprene diblock copolymer which has an overall absolute molecular weight of 20,000 to 40,000, a polystyrene content of 10 to 25%, and a polystyrene block weight average molecular weight of 4000 to 7000.

4 Claims, No Drawings

ADHESIVE COMPOSITION FOR SKIN ADHESION AND BANDAGE APPLICATIONS

CROSSREFERENCE TO RELATED APPLICATION

This application claims the benefit of U.S. provisional application Ser. No. 60/029,303 filed Oct. 24, 1996.

FIELD OF THE INVENTION

This invention relates to novel pressure sensitive adhesive compositions which are especially formulated for use in skin adhesion and bandage applications. More particularly, the present invention relates to the pressure sensitive adhesive compositions for such applications which contain low coupled styrene-isoprene-styrene triblock or multiarm copolymers and low molecular weight, low styrene content styrene-isoprene diblock copolymers.

BACKGROUND OF THE INVENTION

Pressure sensitive adhesives are materials which have tack properties at room temperature. The pressure sensitive adhesive firmly adheres to a variety of dissimilar surfaces without the need of more than finger or hand pressure. It is known that the adhesive should be formed of a composition with sufficient internal strength to prevent leaving a residue of the adhesive on the application surface after the adhesive has been removed. The problem of providing excellent skin adhesion with block copolymer adhesives has persisted. In addition soft polyolefin films or films produced from styrenic block copolymers cannot be used with adhesive systems which have low molecular weight components such as oil and tackifying resins unless a barrier coating is used to block migration of these components.

It is known that block copolymers of vinyl aromatic hydrocarbons and conjugated dienes make good adhesives for a number of adhesive applications. For example, styreneisoprene-styrene (SIS) triblock copolymers are known to make good adhesives for a number of tape applications such as packaging tape. However, only certain SIS adhesives systems along with a tackifing resin work well for skin adhesion and bandage applications. Prior work, such as described in U.S. Pat. No. 5,274,036, has shown that combinations of low coupling efficiency SIS polymers such as KRATON® 1112 and KRATON® 1117 block copolymers made by Shell Oil Company, with low molecular weight liquid rubbers, such as Kuraray LIR 310 (a liquid isoprene-styrene diblock copolymer), Kuraray LIR 50 (a liquid isoprene polymer), and Kuraray LIR 290 (a liquid hydrogenated isoprene polymer), have utility as medical skin adhesives because there are little or no low molecular weight species such as oil or tackifying resin which can cause skin irritation.

However, these combinations exhibit only a marginal peel strength to skin. The peel strength needs to be increased to make commercially successful products. The present invention provides a specific narrowly defined combination of low coupled SIS block copolymers with higher styrene contents than the above triblock copolymers and low molecular weight SI diblock copolymers with a low styrene content.

SUMMARY OF THE INVENTION

This invention provides pressure sensitive adhesive compositions which have unusually high peel and shear values for skin adhesion and bandage adhesives and which do not require the presence of low molecular weight species such as tackifying resins and oils which can cause skin irritation and also migrate into flexible olefin or elastomeric bondage film substrates. The skin adhesion and bandage pressure sensitive adhesive compositions of the present invention are comprised of 100 parts by weight (pbw) of a high molecular weight coupled styrene-isoprene-styrene copolymer and from 100 to 400 parts by weight of a low molecular weight styrene-isoprene diblock copolymer.

The SIS triblock copolymer must be a low coupled triblock or multiarm copolymer wherein the coupling efficiency may range from 20 to 50 percent by weight. The polystyrene content of the polymer may range from 18 to 30 percent by weight. The overall weight average molecular weight of each arm (diblock before coupling) of the copolymer of the present invention ranges from 33,000 to 100,000 and the polystyrene block molecular weight of these copolymers may range from 11,000 to 20,000. The overall absolute molecular weight of the SI diblock may range from 20,000 to 40,000. The polystyrene content of the SI diblock may range from 10 to 25 percent by weight. The polystyrene block weight average molecular weight may range from 4000 to 7000.

DETAILED DESCRIPTION OF THE INVENTION

As is well known, polymers containing both aromatic and ethylenic unsaturation can be prepared by copolymeri-ing one or more polyolefins, particularly a diolefin, in this case isoprene, with one or more alkenyl aromatic hydrocarbon monomers, in this case styrene. The copolymers may, of course, be random, tapered, block or a combination of these, in this case block. The blocks in the copolymers of this invention are linear or multiarm.

Polymers of conjugated diolefins and copolymers of one or more conjugated diolefins and one or more alkenyl aromatic hydrocarbon monomers such as the present S-I-S or SI block copolymers comprised of linear or multiarm polymeric blocks are frequently prepared in solution using anionic polymerization techniques. In general, when solution anionic techniques are used, these S-I-S block copolymers are prepared by contacting the monomers to be polymerized simultaneously or sequentially with an organoalkall metal compound in a suitable solvent at a temperature within the range from about −150° C. to about 300° C., preferably at a temperature within the range from about 0° C. to 100° C. Particularly effective anionic polymerization initiators are organolithium compounds having the general formula:

$$RLi_n$$

Wherein:
R is an aliphatic, cycloaliphatic, aromatic or alkyl-substituted aromatic hydrocarbon having from 1 to about 20 carbon atoms; and n is an integer of 1 to 4.

The concentration of the initiator can be regulated to control the molecular weight of the overall composition and of the polystyrene blocks. Generally, the initiator concentration is in the range of about 0.25 to about 50 millimoles per 100 grams of monomer. The required initiator level frequently depends upon the solubility of the initiator in the hydrocarbon diluent. The ratio of the initiator to the monomer determines the block size, i.e. the higher the ratio of initiator to monomer the smaller the molecular weight of the block.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; and linear and cyclic ethers such as methyl ether, methyl ethyl ether, tetrahydrofuran and the like.

As described in U.S. Pat. No. 4,096,203 the disclosure of which is herein incorporated by reference, usually the styrene is contacted with the initiator. Next, the living polymer in solution is contacted with isoprene. The resulting living polymer has a simplified structure A—B—Li. It is at this point that the living polymer is coupled.

There are a wide variety of coupling agents that can be employed. Any polyfunctional coupling agent which contains at least two reactive sites can be employed. Examples of the types of compounds which can be used include the polyepoxides, polyisocyanates, polyimines, polyaldehydes, polyketones, polyanhydrides, polyesters, polyhalides, and the like. These compounds can contain two or more types of functional groups such as the combination of epoxy and aldehyde groups, isocyanate and halide groups, and the like. Various other substituents which are inert in the treating reaction can be present such as hydrocarbon radicals as exemplified by the alkyl, cycloalkyl, aryl, aralkyl and alkryl groups and the alkoxy, aryloxy, alkyhio, arylthio, and tertiary amino groups. Many suitable types of these polyfunctional compounds have been described in U.S. Pat. Nos. 3,595,941; 3,468,972, 3,135,716; 3,078,254, and 3,594,452, the disclosures of which are herein incorporated by reference. When the coupling agent has two reactive sites such as dibromoethane, the polymer will have a linear ABA structure. When the coupling agent has three or more reactive sites, such as silicon tetrachloride, the polymer will have a branched structure, such as $(AB)_nBA$.

In the prior art, such as that exemplified by U.S. Pat. Nos. 3,595,941 and 3,468,972, the disclosures of which are herein incorporated by reference, the effort was always made to select the particular coupling agent or reaction conditions that resulted in the highest coupling efficiency. Lower coupling efficiencies are desired herein. Coupling efficiency is defined as the weight of molecules of coupled polymer divided by the weight of molecules of coupled polymer plus the weight of molecules of uncoupled polymer. Thus, when producing an SIS linear polymer, the coupling efficiency is shown by the following relationship:

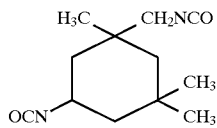

Coupling efficiency can be determined theoretically from the stoichiometric quantity of coupling agent required for complete coupling or coupling efficiency can be determined by an analytical method such as gel permeation chromatography. Typical prior art coupling efficiency is from about 80% to almost 100%. In U.S. Pat. No. 4,096,203, coupling efficiency is controlled from about 20% to about 80%, preferably about 30% to about 70%. It is also within the scope of the present invention to blend polymers from processes of differing coupling efficiency. For example, if a 60% efficiency is desired, then polymers from processes having an 80% efficiency and a 40% efficiency may be blended together or a 100% triblock may be blended with a 100% diblock in a 60:40 ratio.

This coupling efficiency is controlled by a number of methods. One method to reduce coupling efficiency is to add less than the stoichiometric amount of coupling agent required for complete coupling of the polymers. Another means of reducing coupling efficiency is by the premature addition of a terminator compound. These terminators, such as water or alcohol, respond very quickly and could easily be employed to cut short complete coupling of the polymers. In addition, by performing the coupling reaction at elevated temperatures, such as above about 190° F., thermal termination of many of the living polymer groups (A—B—Li) occurs prior to coupling. The typical coupling conditions include a temperature of between about 150° and about 170° F.

Following the coupling reaction or when the desired coupling efficiency has been obtained, the product is neutralize such as by the addition of terminators, e.g., hydrogen, water, alcohol or other reagents, for the purpose of terminating any residual unreacted lithium anions. The product is then recovered such as by coagulation utilizing hot water or steam or both.

The adhesive compositions of this invention should contain 100 parts by weight (pbw) of a high molecular weight low coupled SIS copolymer and from 100 to 400 pbw of low molecular weight diblock copolymer. If less than 100 pbw of the diblock is used, then the adhesive formulation will have poor tack and peel properties. If more than 400 pbw is used, then the shear and holding power properties suffer. It is preferred that the amount of diblock range from 200 to 300 pbw because this gives a good balance of properties.

The overall absolute molecular weight of each arm of the SIS copolymer should range from 33,000 to 100,000. The term "arm molecular weight" is used because the SIS block copolymer may be linear or multiarmed. The polystyrene content should range from 18 to 30% by weight, preferably 20 to 24% by weight, to obtain good shear and peel properties. The coupling efficiency ranges from 20 to 50% by weight, preferably 25 to 45% by weight, to wet out the rough skin surface and to provide good peel properties. The polystyrene block weight average molecular weight should, be from 11,000 to 20,000 to provide sufficient strength.

The overall weight average molecular weight of the low molecular weight diblock should range from 20,000 to 40,000 to provide low viscosities and good tack properties. The polystyrene content should range from 10 to 25% by weight, preferably 11 to 18% by weight, to provide good tack properties. The polystyrene block weight average molecular weight should be from 4000 to 7000, preferably 4000 to 5000, to provide the appropriate balance of low viscosity, tack properties, and peel properties. The low molecular weight diblock is important for achieving pressure sensitive properties and low viscosities for hot melt processing.

The molecular weights of linear polymers or unassembled linear segments of polymers such as mono-, di-, triblock, etc., or the arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/number average molecular weight ratio approaches unity), and it is both convenient and adequately descriptive to report the "peak" molecular weight of the narrow molecular weight distribution observed. Usually, the peak value is between the number and the weight average. The peak molecular weight is the molecular weight of the main species shown on the chromatograph. For polydisperse polymers the weight average molecular weight should be calculated from the chromatograph curve. The materials used in the columns of the GPC are styrene-divinyl benzene gels or silica gels. The solvent is tetrahydrofliran and the detector is a refractive index detector. The absolute molecular weight can be calculated by calibrating the GPC with known polystyrene standards, measuring the styrene block molecular weight during the polymerization, and then measuring the total percent styrene of the molecule by NMR. The absolute arm molecular weight of the total molecule is then calculated by dividing the styrene block molecular weight by the % styrene in the arm.

Methods of controlling the molecular weights of the blocks and the overall polymer are quite well known. For instance, such are disclosed in U.S. Pat. No. 3,149,182, which states that the amount of monomer can be kept constant and different molecular weights can be achieved by changing the amount of catalyst or the amount of catalyst can be kept constant and different molecular weights can be achieved by varying the amount of the monomer, and in U.S. Pat. No. 3,231,635, the disclosures of which are herein incorporated by reference, and many others.

A typical block copolymer composition within the scope of the present invention has 100 parts by weight of an SIS block copolymer which has an overall absolute molecular weight of 141,000 (and thus, an absolute arm molecular weight of 70,500), a coupling efficiency of 35%, a polystyrene block weight average molecular weight of 15,500, a polystyrene content of 22%, and 250 parts by weight of a diblock copolymer. A typical low molecular weight diblock copolymer has an overall absolute peak molecular weight of 30,000, a polystyrene content of 13% by weight, and a polystyrene block molecular weight of 4000.

It is not necessary to add a tackifying resin that is compatible with the elastomeric conjugated diene block as is required in most pressure sensitive adhesive compositions. Low levels can be added if necessary to adjust tack. The composition of the present invention has sufficient tack by virtue of the particular specific combination of polystyrene contents, and dangling rubber chain ends, etc. for it to be extremely useful in the intended applications.

It is preferred that the adhesive composition of the instant invention do not contain plasticizers, such as rubber extending plasticizers, or compounding oils or liquid resins because they are unnecessary and may cause other problems such as migrating into certain flexible substrates.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the adhesive composition.

Stabilizers known in the art may also be incorporated into the adhesive composition. These may be for protection during the life of the disposable article against, for example, oxygen, ozone and ultra-violet radiation. However, these additional stabilizers should be compatible with the essential stabilizers mentioned herein-above and their intended function as taught herein.

The adhesive compositions of the present invention are typically prepared by blending the components at an elevated temperature, preferably between about 130° C. and about 200° C., until a homogeneous blend is obtained, usually less than three (3) hours. Various method of blending are known to the art and any method that produces a homogeneous blend is satisfactory.

EXAMPLES

A number of compositions were prepared for use in the following experiments. These compositions and their characteristics are described below. The polystyrene content was determined by NMR spectroscopy. The polymers used are identified in Table 1 below.

The SAFT (shear adhesion failure temperature) was measured by 1"×1" Mylar to Mylar lap joint with a 1 kg weight. SAFT measures the temperature at which the lap shear assembly fails under load. Rolling Ball Tack (RBT) is the distance a steel ball rolls on the adhesive film with a standard initial velocity (Pressure Sensitive Tape Council Test No. 6). Small numbers indicate aggressive tack. Holding Power (HP) is the time required to pull a standard area (½ in.×½ in.) of tape from a standard test surface (steel, Kraft paper) under a standard load (2 kg), in shear at 2° antipeel (Pressure Sensitive Tape Council Method No. 7). Long times indicate high adhesive strength. 180° peel was determined by Pressure Sensitive Tape Council Method No. 1. Large numbers indicate high strength when peeling a test tape from a steel substrate. Polyken probe tack (PPT) was determined by ASTM D-2979. Loop tack (LT) was determined using TLMI loop tack tester. High numbers for PPT and LT indicate aggressive tack.

TABLE 1

Polymer Identification

| Sample ID | CE(%)* | PSC (wt. %) | Arm Mw | PS Block Mw |
|---|---|---|---|---|
| KRATON ® 1117 | 66 | 17.4 | 61,000 | 10,600 |
| KRATON ® 1119 | 35 | 22 | 70,500 | 15,500 |
| KRATON ® 1112 | 61 | 15 | 73,000 | 10,900 |
| LVSI 101 | 0 | 13 | 31,000 | 4,000 |
| KRATON ® 1111 | 84 | 22 | 70,500 | 15,000 |
| PP5586 | 0 | 13.8 | 30,800 | 4,300 |
| PP5590 | 0 | 13.8 | 34,800 | 4,800 |
| PP5468 | 0 | 24 | 25,800 | 6,200 |
| Polyisoprene | 0 | 0 | 30,000 | 0 |
| PP5469 | 0 | 13.9 | 23,700 | 3,300 |

*Polymers with a coupling efficiency of 0 are diblocks.

TABLE 2

Properties of 1.5 Mils of Adhesive on 1 Mil Mylar

|  | Control 1 | Control 2 | Control 3 | Control 4 |
|---|---|---|---|---|
| KRATON ® 1117 | 100 | 100 |  |  |
| KRATON ® 1119 |  |  | 100 | 100 |
| LVSI 101 | 250 | 350 | 250 | 350 |
| Irganox 1010 | 2 | 2 | 2 | 2 |
| Test Data |  |  |  |  |
| Adhesion to steel[1] ozs/inch | 10.2 | 12.6 | 24.4 | 20.6 |
| Adhesions to skin[2] ozs/inch | 2 | 3.5 | 4 | 7 |
| Mass Transfer to skin[3] | 0 | 0 | 0 | 0 |
| Tack (% paper fiber[4] removal) | 1 | 15 | 40 | 80 |

[1]180° peel
[2]90° peel pulled by hand using a Normark "weigh-in" digital scaler. Adhesive was applied to the inside of the arm where there was no hair using a 4.5 pound rolling (rolled forward and back one time) for 15 minutes before pulling. The tape was pulled at 90° at roughly 12 inches per minute by hand.
[3]Visual observation-adhesive transfer is a qualitative test. The 0 indicates no transfer detectible visually.
[4]Adhesive strip was rolled down on "yellow legal pad" paper and jerked off quickly by hand. Percent area of adhesive containing paper fibers is reported. The fiber tear is a qualitative test. It is a rough determination of the percent area that fiber can be detected on the adhesive surface.

From the limited study above, it is obvious that the higher styrene/low coupled polymer KRATON® 1119 polymer is much superior to KRATON® 1117 polymer.

| Formulation | A | B | C | D | E | F | G | H | I | J | K |
|---|---|---|---|---|---|---|---|---|---|---|---|
| KRATON ® 1112 | 100 | 100 | 100 | 100 | 100 | | | | | | |
| KRATON ® 1117 | | | | | | 100 | | 100 | 100 | 100 | |
| KRATON ® 1119 | | | | | | | 100 | | | | 100 |
| LVSI 101 | | | 250 | | | | | | | 250 | |
| Polyisoprene (30,000) | 250 | | | | | | | | | | |
| PP-5469 | | 250 | | | | | | | | | |
| PP-5586 | | | | | 250 | 250 | 250 | | | | |
| PP-5590 | | | | | | | | 250 | | | |
| PP-5468 | | | | 250 | | | | | 250 | | 250 |
| IRGANOX 1010 | 1 | 1 | 1 | 1 | 1 | 1 | 1 | 1 | 1 | 1 | 1 |
| Rolling Ball (cm) | 1.6 | 1.3 | 1.6 | 1.9 | 1.6 | 1.2 | 1.3 | 1.5 | 2.1 | 1.3 | 2 |
| Polyken Probe (Kg) | 0.44 | 0.64 | 0.66 | 0.89 | 0.61 | 0.65 | 0.62 | 0.61 | 0.72 | 0.63 | 0.88 |
| Loop Tack (oz/in) | | | | | 42 | 40 | 53 | 38 | — | 45 | 37 |
| 180 Peel (pli) | 0.2 | 0.6 | 2 | 1.8 | 1.6 | 1.6 | 2 | 2.3 | 1.7 | 2.1 | 2.2 |
| Holding Power Steel (min) | 1.9* | 26* | 51* | 1030* | 2150** | 2490** | 1630** | 5430** | 5780** | 5950** | >6,000** |
| Holding Power Kraft (min) | 3* | 3* | 12* | 24* | 160** | 180** | 350** | 3330** | 2120** | — | >6,000** |
| SAFT/Mylar (C) | | | | | 67 | 69 | 81 | 71 | 78 | 70 | 83 |
| SAFT/Kraft (C) | | | | | 56 | 58 | 68 | 60 | 59 | 57 | 67 |

*Holding power ½" × ½" 1kg
**Holding Power 1" × 1" 2 Kg
180 peel (PSTC test)
SAFT 1" × 1", 500 grams PSTC test
Rolling Ball PSTC test The conclusion that can be drawn from the data above is
(1) The styrene block of the low molecular weight S-I diblock must be greater than approximately 4,000 molecular weight or the peel and shear properties are poor. (Formulations A and B compared to C, D, E, F, G, H, I, J, K)
(2) KRATON® 1119 formulations have superior peel properties SAFT and shear properties to rough substrates such as Kraft paper (Formulation G compared to E and F, and Formulation K compared to H, I, and J)
(3) Adhesive formulations based on 1119 and liquid S-I diblocks do not contain any low molecular weight, mobile components such as oils and tackifying resins. This should allow the use of flexible substrates based on poly alpha olefins, low density polyethylene, or styrenic block copolymers (SBS, SIS, SEBS, or SEPS) as mentioned in U.S. Pat. No. 4,024,312) or combinations thereof. Normally these flexible films would absorb oils and tackifying resins of normal adhesive formulations, thereby changing the adhesive properties over time. Since the low coupled SIS and SI liquid diblocks are not mobile or fugitive, the adhesive properties will be stable with time and should be ideal adhesives for these flexible substrates.
(4) Formulations containing liquid S-I diblocks which have styrene contents greater than 13 percent styrene and styrene endblocks >4000 show improved holding power and peel properties, particularly when combined with low coupled SIS polymers which have styrene contents greater than 15 percent.

We claim:

1. A pressure sensitive adhesive composition for skin adhesion and bandage: applications which comprises (a) 100 parts by weight of a styrene-isoprene-styrene triblock or multiarm copolymer which has a coupling efficiency of 20 to 50%, an overall absolute arm molecular weight of 33,000 to 100,000, a polystyrene content of 18 to 30%, and a polystyrene block weight average molecular weight of 11,000 to 20,000, and (b) from 100 to 400 parts by weight of a styrene-isoprene diblock copolymer which has an overall absolute molecular weight of 20,000 to 40,000, a polystyrene content of 10 to 25%, and a polystyrene block weight average molecular weight of 4000 to 7000.

2. The composition of claim 1 which comprises from 150 to 300 parts by weight of the diblock copolymer.

3. The composition of claim 2 wherein the coupling efficiency of copolymer (a) is 25 to 45% and the polystyrene content is 20 to 24%.

4. The composition of claim 2 wherein the polystyrene block molecular weight of the diblock is from 4000 to 5000 and the polystyrene content is 11 to 18%.

* * * * *